United States Patent
Max et al.

(10) Patent No.: US 11,971,495 B2
(45) Date of Patent: *Apr. 30, 2024

(54) METHOD FOR A TRANSPORTATION VEHICLE OF A TRANSPORTATION VEHICLE FLEET FOR TRANSMITTING DATA TO A DATA PROCESSING SYSTEM, METHOD FOR A DATA PROCESSING SYSTEM FOR TRANSMITTING DATA OF A TRANSPORTATION VEHICLE FLEET TO THE DATA PROCESSING SYSTEM, AND TRANSPORTATION VEHICLE

(71) Applicant: VOLKSWAGEN AKTIENGESELLSCHAFT, Wolfsburg (DE)

(72) Inventors: Stephan Max, Gifhorn (DE); Peter Baumann, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,110

(22) Filed: Oct. 12, 2021

(65) Prior Publication Data

US 2022/0028276 A1    Jan. 27, 2022

Related U.S. Application Data

(63) Continuation of application No. 16/481,857, filed as application No. PCT/EP2018/051302 on Jan. 19, 2018, now Pat. No. 11,150,319.

(30) Foreign Application Priority Data

Jan. 31, 2017 (DE) ..................... 10 2017 201 514.4

(51) Int. Cl.
*G01S 5/00* (2006.01)
*G08G 1/00* (2006.01)
*G08G 1/01* (2006.01)

(52) U.S. Cl.
CPC .......... *G01S 5/0027* (2013.01); *G08G 1/0112* (2013.01); *G08G 1/0133* (2013.01); *G08G 1/20* (2013.01)

(58) Field of Classification Search
CPC ..... H04W 4/44; H04W 4/46; H04W 56/0035; H04L 1/0082; H04L 67/12; H04L 67/322;
(Continued)

(56) References Cited

U.S. PATENT DOCUMENTS 5,729,540 A    3/1998 Wegrzyn
6,862,500 B2   3/2005 Tzamaloukas
(Continued)

FOREIGN PATENT DOCUMENTS

CN    1787479 A    6/2006
CN    101127661 A  *  2/2008
(Continued)

OTHER PUBLICATIONS

Ayala et al.; Communication Reduction for Floating Car Data-based Traffic Information Systems; 2010 Second International Conference on Advanced Geographic Information Systems, Applications, and Services; 2010; pp. 44-51.
(Continued)

*Primary Examiner* — Matthew C Sams
(74) *Attorney, Agent, or Firm* — Barnes & Thornburg LLP

(57) ABSTRACT

A method for a transportation vehicle of a transportation vehicle fleet for transmitting data to a data processing system including receiving a message, wherein the message includes information about data to be transmitted and infor-
(Continued)

mation about a predetermined probability of the data transmission; determining whether the data to be transmitted are transmitted from the transportation vehicle to the data processing system, using a random number generator and the information about the predetermined probability of the data transmission; and sending the data to be transmitted to the data processing system, in response to determining that the data to be transmitted are transmitted from the transportation vehicle to the data processing system.

20 Claims, 2 Drawing Sheets

(58) Field of Classification Search
CPC .... G08G 1/093; G08G 1/0112; G08G 1/0133; G08G 1/20; G01S 5/0027
See application file for complete search history.

(56) References Cited

U.S. PATENT DOCUMENTS

| | | | |
|---|---|---|---|
| 8,923,147 B2 | 12/2014 | Krishnaswamy | |
| 9,053,631 B2 | 6/2015 | Skupin | |
| 9,189,961 B2 | 11/2015 | Mehr et al. | |
| 11,150,319 B2* | 10/2021 | Max | G01S 5/0027 |
| 2004/0230373 A1 | 11/2004 | Tzamaloukas | |
| 2005/0281209 A1* | 12/2005 | Cai | H04W 74/00 370/328 |
| 2010/0195515 A1* | 8/2010 | Lin | H04L 67/12 370/252 |
| 2013/0083679 A1 | 4/2013 | Krishnaswamy | |
| 2015/0177399 A1* | 6/2015 | Adragna | G01V 1/22 709/219 |
| 2015/0334760 A1* | 11/2015 | Sartori | H04L 12/6418 370/329 |
| 2017/0109373 A1* | 4/2017 | Sung | G06Q 20/20 |
| 2018/0067218 A1* | 3/2018 | Kurihara | G01V 1/223 |

FOREIGN PATENT DOCUMENTS

| | | | |
|---|---|---|---|
| CN | 103890823 | A | 6/2014 |
| CN | 104471624 | A | 3/2015 |
| CN | 104838434 | A | 8/2015 |
| CN | 105203116 | A | 12/2015 |
| CN | 105721544 | A | 6/2016 |
| CN | 106130737 | A | 11/2016 |
| DE | 19517309 | A1 | 6/1996 |
| DE | 19548019 | A1 | 8/1996 |
| DE | 19508486 | A1 | 9/1996 |
| DE | 102004035897 | A1 | 3/2006 |
| DE | 102007006227 | A1 | 8/2008 |
| DE | 102007023135 | A1 | 11/2008 |
| DE | 102010028996 | A1 | 11/2011 |
| DE | 102012005012 | A1 | 9/2012 |
| DE | 102012018613 | A1 | 3/2014 |
| DE | 102015219933 | A1 | 11/2016 |
| EP | 2026311 | A1 | 2/2009 |
| EP | 2229668 | A1 | 9/2010 |

OTHER PUBLICATIONS

Tanizaki et al.; Randomization in Traffic Information Sharing Systems; Proceedings of the 15th International Symposium on Advances in Geographic Information Systems; ACM GIS; 2007.
Search Report for International Patent Application No. PCT/EP2018/051302; Apr. 13, 2018.
Google Patents; Translation of Cn 1787479A; https://patents.google.com/patent/CN1787479A/en?oq=cn1787479a; 2004.
Tanizaki et al.; Randomization in Traffic Information Sharing System; Proceedings of the 15th annual ACM International symposium on Advances in geographic information systems; Nov. 7, 2007; pp. 1-8.
Office Action; Chinese Patent Application No. 201880009439.7; Oct. 9, 2022.

* cited by examiner

METHOD FOR A TRANSPORTATION VEHICLE OF A TRANSPORTATION VEHICLE FLEET FOR TRANSMITTING DATA TO A DATA PROCESSING SYSTEM, METHOD FOR A DATA PROCESSING SYSTEM FOR TRANSMITTING DATA OF A TRANSPORTATION VEHICLE FLEET TO THE DATA PROCESSING SYSTEM, AND TRANSPORTATION VEHICLE

PRIORITY CLAIM

This patent application is a continuation of U.S. patent application Ser. No. 16/481,857, filed 30 Jul. 2019, which is a U.S. National Phase of International Patent Application No. PCT/EP2018/051302, filed 19 Jan. 2018, which claims priority to German Patent Application No. 10 2017 201 514.4, filed 31 Jan. 2017, the disclosures of which are incorporated herein by reference in their entireties.

SUMMARY

Illustrative embodiments relate to the transmission of data from a transportation vehicle fleet to a data processing system. In particular, the illustrative embodiments relate to a method for a transportation vehicle of a transportation vehicle fleet for the transmission of data to a data processing system, a method for a data processing system for transmitting data from a transportation vehicle fleet to the data processing system, and a transportation vehicle.

BRIEF DESCRIPTION OF THE DRAWINGS

Exemplary embodiments are explained in more detail below, referring to the attached figures. In the figures.

DETAILED DESCRIPTION

Figure 1:
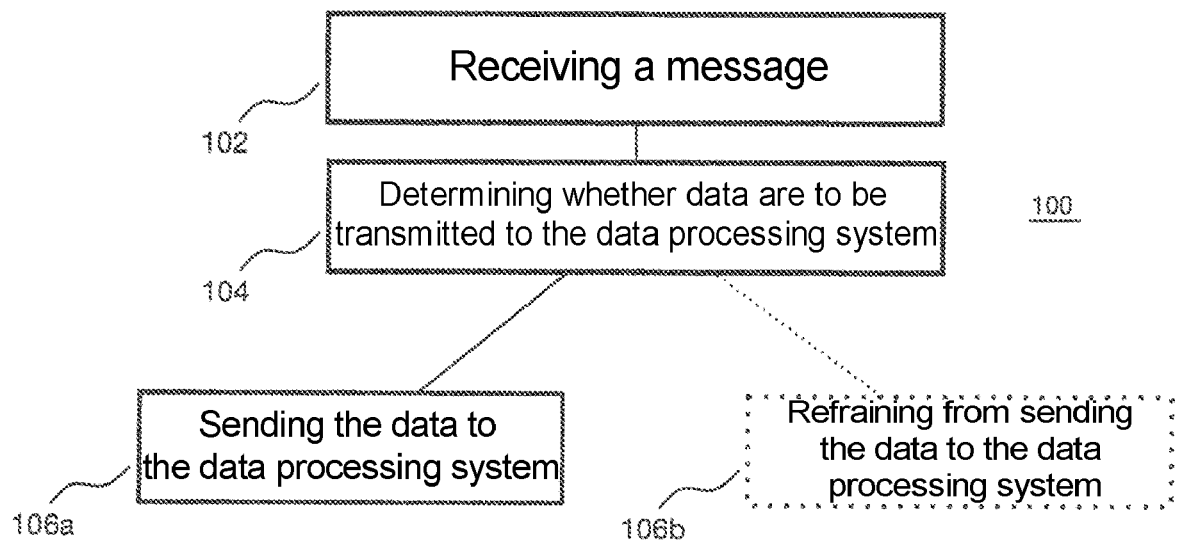
FIG. 1 shows a flow diagram of an exemplary embodiment of a transportation vehicle of a transportation vehicle fleet for the transmission of data to a data processing system.

A transportation vehicle is a mobile transportation resource for the transport of persons or goods. The transportation vehicle can therefore be both a passenger transportation vehicle and a commercial transportation vehicle. For example, a transportation vehicle can be a passenger car, a truck, a motorcycle or a tractor. In general, a transportation vehicle can be regarded as a device comprising an engine, a powertrain system and wheels.

Due to digitalization, more and more data are being collected in transportation vehicles. However, it is often only necessary for a proportion of transportation vehicles in a transportation vehicle fleet to send the data thereof to a back-end (for example, a transportation vehicle manufacturer or other service provider).

In document DE 195 08 486 A1, a method for reducing the amount of data to be transmitted from a transportation vehicle is proposed. Position data of the transportation vehicle are reduced and sent out by the transportation vehicle together with selected other transportation vehicle data. However, no solution can be found in DE 195 08 486 A1 for the transmission of data of only part of a transportation vehicle fleet to a back-end.

Document DE 195 17 309 C2 proposes a method for reducing the amount of data to be transmitted from the transportation vehicles of a fleet of transportation vehicles. Transportation vehicle data are exchanged and processed between some transportation vehicles in the fleet of transportation vehicles. The processed data are transmitted by a selected transportation vehicle to a central computer. However, no solution can be found in DE 195 08 486 A1 for the transmission of data of only part of a transportation vehicle fleet to a back-end.

There is therefore a need to provide a way of transmitting data of only part of a transportation vehicle fleet to a back end.

Disclosed embodiments provide a method for a transportation vehicle of a transportation vehicle fleet for the transmission of data to a data processing system. The disclosed method involves receiving a message (by the transportation vehicle). The message contains information about data to be transmitted and information about a predetermined probability of data transmission. In addition, the method involves determining (by the transportation vehicle) whether the data to be transmitted are transmitted from the transportation vehicle to the data processing system, using a random generator and providing information about the predetermined probability of the transmission. The method also includes sending the data to be transmitted to the data processing system (by the transportation vehicle) if it is determined that the data to be transmitted are transmitted from the transportation vehicle to the data processing system.

The method can make it possible for a transportation vehicle of the fleet of transportation vehicles to automatically determine whether or not it transmits its data to the data processing system. By specifying the probability of data transmission, the number or proportion of transportation vehicles of the fleet of transportation vehicles transmitting the data thereof can be adjusted.

According to some exemplary embodiments, the data to be transmitted are therefore not transmitted to the data processing system if it is determined that the data to be transmitted are not transmitted from the transportation vehicle to the data processing system. In this way, it can be ensured that only transportation vehicles of the fleet of transportation vehicles send data to the data processing system that have determined that data must be transmitted from the transportation vehicle to the data processing system. Accordingly, it can be enabled that data are only sent to the data processing system from the desired number or proportion of transportation vehicles of the fleet of transportation vehicles.

The data to be transmitted may be, for example, measurement data of a transportation vehicle sensor (for example, a temperature sensor, an ESP sensor, an odometer, a rain sensor, a pressure sensor, a transportation vehicle camera, a position sensor). Alternatively, the data to be transmitted may also be measurement data of one or more transportation vehicle sensors evaluated or processed by the transportation vehicle. The data to be transmitted may also be, for example, status data of a transportation vehicle (for example, mileage, remaining time or mileage until the next service, error or warning messages).

The information about the predetermined probability of data transmission indicates the probability of a single transportation vehicle of the fleet of transportation vehicles (i.e., a plurality of transportation vehicles) participating in the data transmission. The information about the predetermined probability of data transmission is therefore a measure of the sample size within the fleet of transportation vehicles.

The random generator is a method for generating a sequence of random states from a predetermined set of states. For example, the random generator can be a random number generator. The random number generator can be both a non-deterministic random number generator (which uses physical processes, for example) and a deterministic random number generator (which uses a deterministic algorithm, for example). For example, the distribution generated by the deterministic random number generator can be a normal distribution, a uniform distribution or an exponential distribution.

For example, determining whether the data to be transmitted are transmitted from the transportation vehicle to the data processing system can include generating a random number within a preset range of values (for example, 1 and 100) by the random generator. Based on the information about the predetermined probability of data transmission, a range (proportion) can be selected from the preset range of values that corresponds to the predetermined probability. For example, for a probability of 10%, the range from 1 to 10 can be selected from the default range of 1 and 100. If the random number generated is in the range of 1 to 10, it is determined that the transportation vehicle transmits the data to be transmitted to the data processing system. If the random number generated is outside this range, i.e., between 11 and 100, it may be determined that the transportation vehicle does not transmit the data to be transmitted to the data processing system.

For example, the data processing system can be a backend, a computer cloud, a computer, a processor, or a programmable hardware component.

The message can be received by the transportation vehicle, for example, via a cellular network (for example, according to a standard of the 3rd Generation Partnership Project, 3GPP) or via a local wireless network (for example, according to a standard of the Institute of Electrical and Electronics Engineers, IEEE). Accordingly, the transmission of the data to be transmitted to the data processing system can also be carried out over a cellular network or over a local wireless network.

According to some disclosed embodiments, the message may also include repetition information regarding a repetition of the determination of whether the data to be transmitted are transmitted from the transportation vehicle to the data processing system. The method can then include a re-determination of whether the data to be transmitted are transmitted from the transportation vehicle to the data processing system, based on the repetition information. In this way, the transportation vehicle may be informed as to whether it should determine only once or several times whether it should send its data to the data processing system. Accordingly, the transportation vehicle can determine once or several times whether it sends its data to the data processing system.

According to some disclosed embodiments, the repetition information can indicate, for example, the re-determination of whether the data to be transmitted are transmitted from the transportation vehicle to the data processing system after the expiry of a predetermined time period since the (previous or last) determination of whether the data to be transmitted are transmitted from the transportation vehicle to the data processing system. In this way, for example, the transportation vehicle can be prompted every second, every 10 seconds, every 30 seconds, every minute, every 5 minutes, every 10 minutes, every 30 minutes, etc. to determine whether it can send its data to the data processing system.

In some disclosed embodiments, the repetition information can alternatively also indicate whether the data to be transmitted from the transportation vehicle to the data processing system are transmitted after a predetermined distance has been travelled by the transportation vehicle since the (previous or last) determination of whether the data to be transmitted are transmitted from the transportation vehicle to the data processing system. In this way, for example, the transportation vehicle can be prompted every 100 meters, 250 meters, 500 meters, 1 kilometer, 5 kilometers, 10 kilometers etc. to determine whether it can send its data to the data processing system.

In this way, the positive sample of transportation vehicles in the fleet of transportation vehicles can be changed cyclically, so that the entire fleet of transportation vehicles has participated in the data transmission (data upload) at individual intervals or distances with a high probability, depending on the probability of participation (predetermined probability of data transmission) and the time span (time interval) or the distance travelled.

According to some disclosed embodiments, the method may also include receiving a second message. The second message contains information about a predetermined second probability of data transmission. The method may accordingly redetermine whether the data to be transmitted are transmitted from the transportation vehicle to the data processing system, using the random generator and the second information regarding the predetermined second probability of data transmission. In this way, the desired number or proportion of transportation vehicles for data transmission from the fleet of transportation vehicles can be adapted to the data processing system. In this way, for example, changing conditions of the fleet of transportation vehicles or the transportation vehicle can be addressed. For example, if the transportation vehicle is initially located in a location A where many transportation vehicles of the fleet of transportation vehicles are located, a data transmission by a smaller proportion of the transportation vehicles of the fleet of transportation vehicles located at location A may be sufficient. If the transportation vehicle is in another location B at a later stage where there are few transportation vehicles of the fleet of transportation vehicles, a data transmission from a larger proportion of the transportation vehicles of the fleet of transportation vehicles located at place B may be necessary. Accordingly, information about a lower predetermined probability of data transmission can first be transmitted to the transportation vehicle at location A and then information about a higher predetermined probability of data transmission can be transmitted to location B.

According to another disclosed embodiment, the transmission of the data of a part of a transportation vehicle fleet is made possible by a method for a data processing system for transmitting data of a transportation vehicle fleet to the data processing system. The method involves sending a message to transportation vehicles in the fleet of transportation vehicles. The message contains information about data to be transmitted and information about a predetermined probability of data transmission. Furthermore, the method involves receiving the data to be transmitted from at least one transportation vehicle of the fleet of transportation vehicles. The at least one transportation vehicle has determined, using a random generator and the information about the predetermined probability of data transmission, that the data to be transmitted are transmitted from the transportation vehicle to the data processing system.

The method may make it possible for transportation vehicles of the fleet of transportation s to automatically determine whether or not to transmit the data thereof to the data processing system. By specifying the probability of data transmission, the number or proportion of transportation vehicles from the fleet of transportation vehicles transmitting the data thereof can be adjusted.

In some disclosed embodiments, the message may also include repetition information about a repetition of the determination of whether the data to be transmitted are transmitted from the transportation vehicle to the data processing system. In this way, the transportation vehicle may be informed whether it should determine only once or several times whether it sends its data to the data processing system.

According to some disclosed embodiments, the method may also include sending a second message to transportation vehicles of the fleet of transportation vehicles. The second message contains information about a predetermined second probability of data transmission. In this way, the desired number or proportion of transportation vehicles from the fleet of transportation vehicles for data transmission can be adapted to the data processing system. In this way, for example, changing conditions of the fleet of transportation vehicles or the transportation vehicle can be addressed.

It goes without saying that exemplary embodiments also include a program with a program code for performing one of the methods described herein, if the program code is running or is executed on a data processing system (for example, a back-end, a computer cloud, a computer, a processor or a programmable hardware component).

According to yet another disclosed embodiment, the transmission of the data of a part of a transportation vehicle fleet is made possible by a transportation vehicle for the transmission of data to a data processing system. The transportation vehicle includes a receiving circuit that is set up to receive a message. The message contains information about data to be transmitted and information about a predetermined probability of data transmission. In addition, the transportation vehicle includes a processor circuit set up to determine whether the data to be transmitted are transmitted from the transportation vehicle to the data processing system, using a random generator and the information about the predetermined probability of data transmission. In addition, the transportation vehicle includes a transmission circuit that is set up to transmit the data to be transmitted to the data processing system if the processor circuit determines that the data to be transmitted are transmitted from the transportation vehicle to the data processing system.

The transportation vehicle may determine automatically whether or not it transmits the data thereof to the data processing system. By specifying the probability of data transmission, a number or a proportion of transportation vehicles in a transportation vehicle fleet that transmit the data thereof can be determined.

In some further exemplary embodiments, the transportation vehicle or components of the transportation vehicle (in particular, the receiving circuit and the processor circuit) may be set up to carry out one or more of the further aforementioned process operations.

In FIG. 1, a method 100 for a transportation vehicle of a transportation vehicle fleet for the transmission of data to a data processing system is shown. The method 100 involves receiving 102 a message. The message contains information about data to be transmitted and information about a predetermined probability of data transmission. Furthermore, the method 100 includes a determination 104 of whether the data to be transmitted are transmitted from the transportation vehicle to the data processing system, using a random generator and the information about the predetermined probability of the transmission. The method 100 also includes sending 106a the data to be transmitted to the data processing system if it is determined that the data to be transmitted are transmitted from the transportation vehicle to the data processing system.

If it is determined that the data to be transmitted are not to be transmitted from the transportation vehicle to the data processing system, the method 100 may include refraining 106b from sending the data to be transmitted to the data processing system.

The method 100 may enable a transportation vehicle of the fleet of transportation vehicles to determine automatically whether or not it transmits the data thereof to the data processing system. By specifying the probability of data transmission, the number or proportion of transportation vehicles from the fleet of transportation vehicles transmitting the data thereof can be adjusted. In this way, it can be ensured that only the transportation vehicles of the fleet of transportation vehicles send data to the data processing system that have determined that data from the transportation vehicle must be transmitted to the data processing system. Accordingly, it can be enabled that data are only sent to the data processing system from the desired number or proportion of transportation vehicles of the fleet of transportation vehicles.

The method 100 can be integrated into the transportation vehicle as a random transmission algorithm in some exemplary embodiments. The method can, for example, be used to perform a comprehensive temperature measurement by the fleet of transportation vehicles. For example, a back-end can request 10% of all transportation vehicles in the fleet of transportation vehicles for this. In accordance with the method 100, the transportation vehicles now automatically determine whether they participate in the data transmission by opting for it with a random distribution of 1:9.

For example, the back-end can send a measurement order to the transportation vehicle. Not only the required data (for example, temperature and position) are passed, but also the sample size of the fleet or the probability that the transportation vehicle should participate in the data upload. For example, the transportation vehicle now uses a random algorithm and the given probability to determine whether it can participate in the upload. If the test is negative, it does not participate. If the test is positive, the transportation vehicle starts the data upload.

As indicated above, the method 100 can be extended, for example, by an interval travelling time or a distance at which the transportation vehicle is to repeat the test. For example, every 10 minutes it can randomly determine whether it should participate in the upload or not. In this way, the positive sample of transportation vehicles in the fleet of transportation vehicles can be changed cyclically, so that depending on the probability of participation and the time interval, the entire fleet of transportation vehicles is likely to participate in the data upload at individual intervals. In this way, for example, with static or quasi-static measurement states, a high measurement density can be achieved with a low upload volume at the same time.

Further details and properties of the method 100 are described in connection with one or more other exemplary embodiments. The method 100 may include one or more optional features according to one or more of the other exemplary embodiments.

Figure 2:
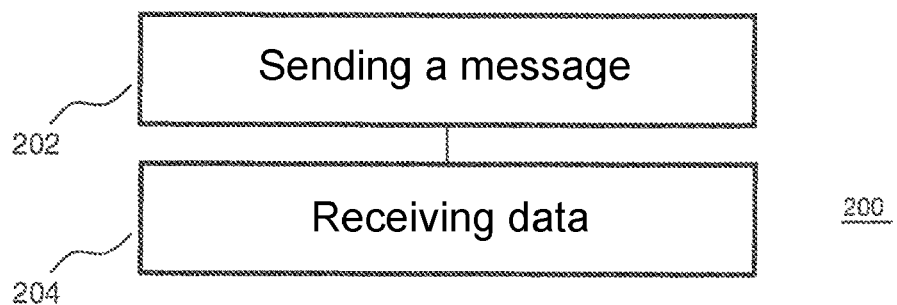
FIG. 2 shows a flow diagram of an exemplary embodiment of a method for a data processing system for transmitting data of a transportation vehicle fleet to the data processing system.

In addition, FIG. 2 shows a method 200 for a data processing system for transmitting data from a transportation vehicle fleet to the data processing system. The method 200 involves sending 202 a message to transportation vehicles in the fleet of transportation vehicles. The message contains information about data to be transmitted and information about a predetermined probability of data transmission. Furthermore, the method 200 includes receiving 202 the data to be transmitted from at least one transportation vehicle of the fleet of transportation vehicles. The at least one transportation vehicle has determined, using a random generator and the information about the predetermined probability of data transmission, that the data to be transmitted are transmitted from the transportation vehicle to the data processing system.

The method 200 may make it possible for transportation vehicles of the fleet of transportation vehicles to automatically determine whether or not to transmit the data thereof to the data processing system. By specifying the probability of data transmission, the number or proportion of transportation vehicles from the fleet of transportation vehicles transmitting the data thereof can be adjusted.

Further details and properties of the method 200 are described in connection with one or more other exemplary embodiments. The method 200 may include one or more optional features according to one or more of the other exemplary embodiments.

Figure 3:
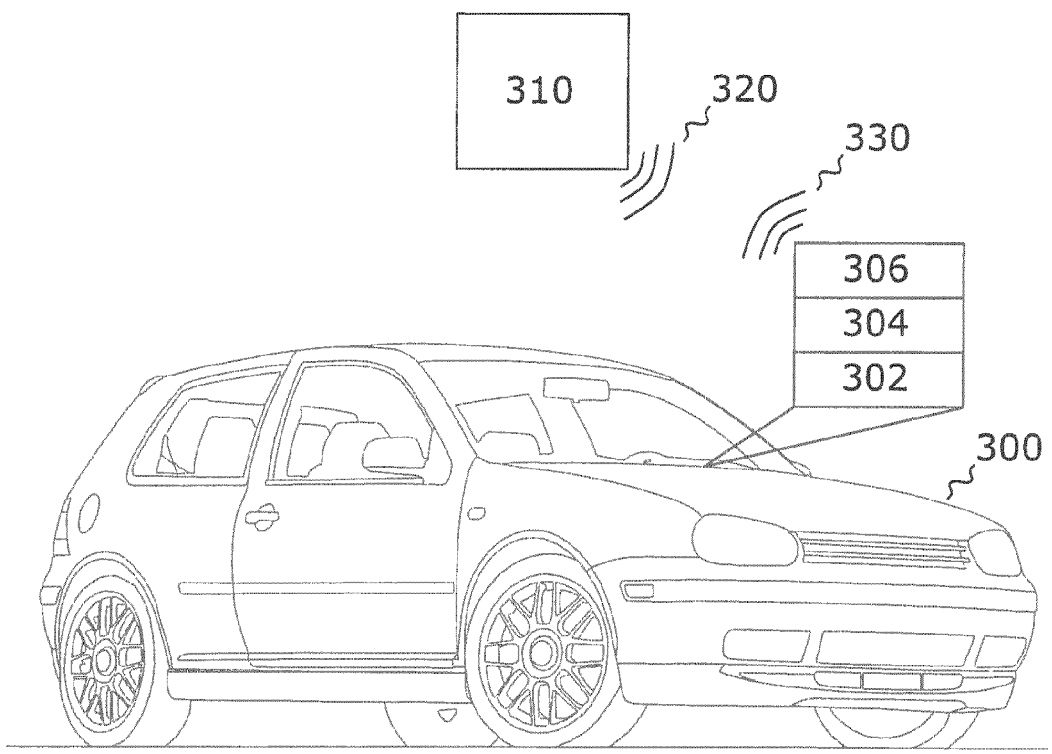
FIG. 3 shows an exemplary embodiment of a transportation vehicle.

FIG. 3 shows a transportation vehicle 300 for transmitting data to a data processing system 310. The transportation vehicle 300 comprises a receiving circuit 302 that is set up to receive a message 320. The message 320 contains information about data to be transmitted 330 and information about a predetermined probability of data transmission. In addition, the transportation vehicle 300 comprises a processor circuit 304 that is set up to determine whether the data to be transmitted 330 are transmitted from the transportation vehicle 300 to the data processing system 310, using a random generator and information about the predetermined probability of data transmission. In addition, the transportation vehicle 300 includes a transmission circuit 306 that is set up to send the data to be transmitted 330 to the data processing system 310 if the processor circuit determines that the data to be transmitted 330 are transmitted from the transportation vehicle 300 to the data processing system 310.

The receiving circuit 302 is a circuit that is set up to receive the message 320 wirelessly. For example, a message 320 can be received from the data processing system 310 over a cellular network or over a local wireless network.

For example, the processor circuit 304 can comprise one or more processors or one or more processor cores, an application-specific integrated circuit (ASIC) and an integrated circuit (IC), a system on a chip (SoC), a programmable logic element, or a field programmable gate array (FPGA) with a microprocessor on which software runs for determining whether the data to be transmitted 330 are transmitted from the transportation vehicle 300 to the data processing system 310. Furthermore, the processor circuit 304 may have one or more memories, in which, for example, the software for determining whether the data to be transmitted 330 are transmitted from the transportation vehicle 300 to the data processing system 310 or other data may be stored.

The transmission circuit 306 can be set up, for example, for wireless communication with the data processing system 310. For example, the transmission circuit can include a transmitter or a transmitter-receiver for communication with the data processing system 310 over a cellular network or over a local wireless network. In some exemplary embodiments, the receiving circuit 302 and the transmission circuit 306 may comprise a common transmitter-receiver.

The transportation vehicle 300 can automatically determine whether or not it transmits the data thereof to the data processing system 310. By specifying the probability of data transmission, a number or a proportion of transportation vehicles in a transportation vehicle fleet that transmit the data thereof can be determined.

Further details and properties of the transportation vehicle 300 are described above in connection with one or more exemplary embodiments. The transportation vehicle 300 may include one or more optional features according to one or more of the above exemplary embodiments.

REFERENCE CHARACTER LIST

100 Method for a transportation vehicle of a transportation vehicle fleet for the transmission of data to a data processing system
102 Receiving a message
104 Determining whether the data to be transmitted are transmitted from the transportation vehicle to the data processing system
106a Sending the data to be transmitted to the data processing system
106b Refraining from sending the data to be transmitted to the data processing system
200 Method for a data processing system for transmitting data from a transportation vehicle fleet to the data processing system
202 Sending a message to transportation vehicles of the fleet of transportation vehicles
204 Receiving the data to be transmitted from at least one transportation vehicle of the fleet of transportation vehicles
300 Transportation vehicle
302 Receiving circuit
304 Processor
306 Transmission circuit
310 Data processing system
320 Message
330 Data to be transmitted

The invention claimed is:

1. A method for implementation on a data processing system to orchestrate transmission of data from a transportation vehicle fleet to the data processing system remote from the transportation vehicle fleet, the transportation vehicle fleet including a plurality of remote transportation vehicles, the method comprising:
the data processing system sending a first message to at least two transportation vehicles of the transportation vehicle fleet, wherein the first message includes measurement order information indicating data to be measured and transmitted by the transportation vehicle and information indicating a predetermined transmission probability that is specific to transportation vehicles receiving the first message, wherein the predetermined transmission probability information provides an indication of a sample size within the plurality of transportation vehicles that indicates a probability that the transportation vehicle must participate in a data upload to the data processing system, wherein the predetermined transmission probability is used by each transportation vehicle that receives the first message to automatically determine whether to participate in the data upload to the data processing system; and the data processing system receiving the data indicated in the measurement order information of the first message, wherein the received data has been transmitted from at least one transportation vehicle of the transportation vehicle fleet, wherein the automatic determination by the at least one transportation vehicle whether to transmit the data to the data processing system is based both on the predetermined transmission probability information transmitted by the data processing system in the first message and a state included in a sequence of random states generated from a set of predetermined states via a random generator, wherein the automatic determination performed by the transportation vehicle of whether to transmit the data to the data processing system indicates that the data to be transmitted to the data processing system must be transmitted from the transportation vehicle to the data processing system to comply with the predetermined transmission probability, wherein the first message further comprises repetition information that dictates whether there is a need to re-determine whether to perform data transmission from the transportation vehicle to the data processing system again, wherein the transportation vehicle determines whether to determine only once or several times whether to send data to the data processing system based on analysis of the repetition information dictated by the data processing system in the first message, wherein the determinations and re-determinations are chronologically successive determinations, and wherein the repetition information indicates a period between successive determinations defined by the distance traveled by the transportation vehicle between successive determinations.

2. The method of claim 1, further comprising sending a second message to transportation vehicles of the fleet of transportation vehicles that includes information indicating a predetermined second probability of data transmission.

3. The method of claim 1, wherein the measurement order specifies the type of data to be measured.

4. The method of claim 3, wherein the type of data includes at least one of temperature and position data.

5. The method of claim 3, wherein data processing system receives uploaded data from a transportation vehicle of the fleet in response to a probability determination performed by the transportation vehicle indicating that the transportation vehicle can participate in the upload.

6. The method of claim 5, wherein a cyclically changing, positive sample of transportation vehicles in the fleet is generated by the data upload by the data processing system specifying in the first message an interval travelling time or a distance at which the transportation vehicle is to repeat the probability determination.

7. The method of claim 6, wherein the cyclically changing, positive sample of transportation vehicles in the fleet is based on the probability of participation and the time interval, whereby the entire fleet of transportation vehicles participates in the data upload at individual intervals.

8. The method of claim 7, wherein a specified level of measurement density is achieved with a dissimilar data upload volume using static or quasi-static measurement states.

9. The method of claim 1, further comprising adjusting the proportion of transportation vehicles of the fleet of transportation vehicles transmitting the data by specifying the probability of data transmission in messages to the transportation vehicles.

10. The method of claim 1, wherein the repetition information also indicates a predetermined period of time between successive determinations.

11. A data processing system implemented on a non-transitory computer-readable medium, the data processing system orchestrating transmission of data from a transportation vehicle fleet to the data processing system, wherein the transportation fleet comprises a plurality of transportation vehicles that are remote from the data processing system, wherein the data processing system:

sends a first message to at least two transportation vehicles of the transportation vehicle fleet, wherein the first message includes of the transportation vehicle fleet, wherein the first message includes measurement order information indicating data to be measured and transmitted by the transportation vehicle and information indicating a predetermined probability of data transmission probability that is specific to transportation vehicles receiving the first message, wherein the predetermined transmission probability information provides an indication of a sample size within the plurality of transportation vehicles that indicates a probability that the transportation vehicle must participate in a data upload to the data processing system, wherein the predetermined transmission probability is used by each transportation vehicle that receives the first message to automatically determine whether to participate in the data upload to the data processing system; and receives the data indicated in the measurement order information of the first message, wherein the received data has been has been transmitted from at least one transportation vehicle in the fleet of transportation vehicles, wherein the automatic determination by the at least one transportation vehicle whether to transmit the data to the data processing system is based both on the predetermined transmission probability information transmitted by the data processing system in the first message and a state included in a sequence of random states generated from a set of predetermined states via a random generator, wherein the automatic determination performed by the transportation vehicle of whether to transmit the data to the data processing system indicates that the data to be transmitted to the data processing system must be transmitted from the transportation vehicle to the data processing system to comply with the predetermined transmission probability, wherein the first message further comprises repetition information that dictates whether there is a need to re-determine whether to perform data transmission from the transportation vehicle to the data processing system again, wherein the transportation vehicle determines whether to determine only once or several times whether to send data to the data processing system based on analysis of the repetition information dictated by the data processing system in the first message, wherein the determinations and re-determinations are chronologically successive determinations, and wherein the repetition information indicates a period between successive determinations defined by the distance traveled by the transportation vehicle between successive determinations.

12. The data processing system of claim 11, wherein a second message is sent to transportation vehicles of the fleet of transportation vehicles that includes information indicating a predetermined second probability of data transmission.

13. The data processing system of claim 11, wherein the measurement order specifies the type of data to be measured.

14. The data processing system of claim 13, wherein the type of data includes at least one of temperature and position data.

15. The data processing system of claim 13, wherein data processing system receives uploaded data from a transportation vehicle of the fleet in response to a probability determination performed by the transportation vehicle indicating that the transportation vehicle can participate in the upload.

16. The data processing system of claim 15, wherein a cyclically changing, positive sample of transportation vehicles in the fleet is generated by the data upload by the data processing system specifying in the first message an interval travelling time or a distance at which the transportation vehicle is to repeat the probability determination.

17. The data processing system of claim 16, wherein the cyclically changing, positive sample of transportation vehicles in the fleet is based on the probability of participation and the time interval, whereby the entire fleet of transportation vehicles participates in the data upload at individual intervals.

18. The data processing system of claim 17, wherein a specified level of measurement density is achieved with a dissimilar data upload volume using static or quasi-static measurement states.

19. The data processing system of claim 11, wherein the proportion of transportation vehicles of the fleet of transportation vehicles transmitting the data is adjusted by specifying the probability of data transmission in messages to the transportation vehicles.

20. The data processing system of claim 11, wherein the repetition information also indicates a predetermined period of time between successive determinations.

* * * * *